No. 759,229. PATENTED MAY 10, 1904.
A. & A. C. BECHTOLD.
APPARATUS FOR TESTING THE EYESIGHT.
APPLICATION FILED AUG. 20, 1902. RENEWED AUG. 12, 1903.
NO MODEL. 2 SHEETS—SHEET 1.
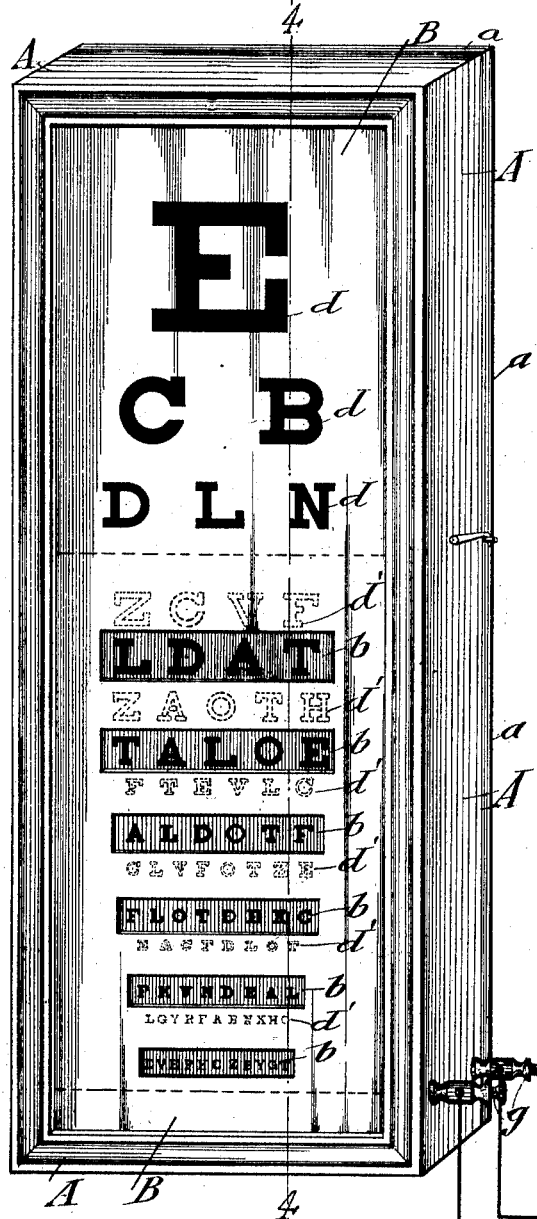
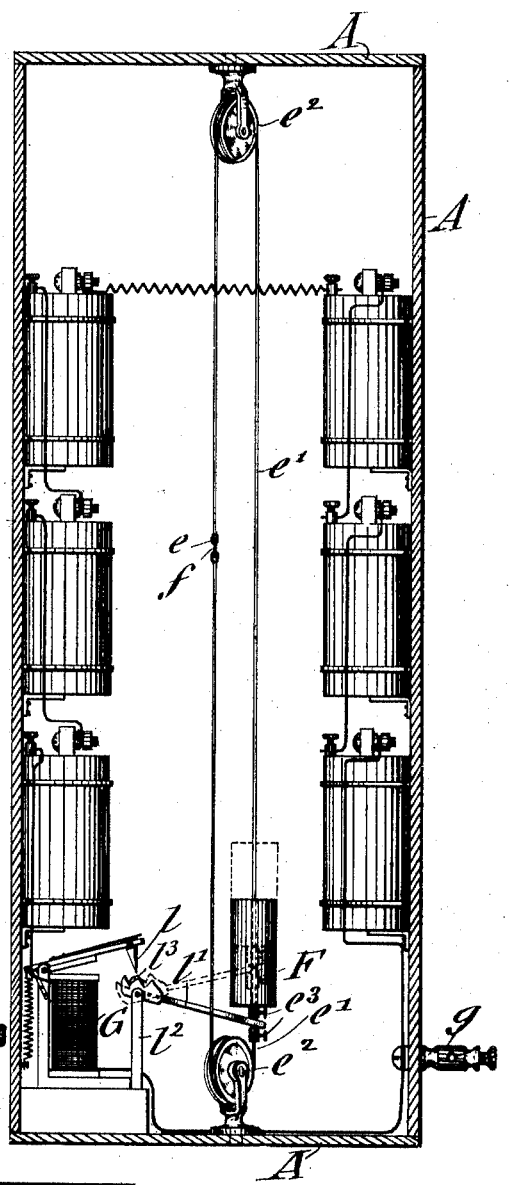

No. 759,229. PATENTED MAY 10, 1904.
A. & A. C. BECHTOLD.
APPARATUS FOR TESTING THE EYESIGHT.
APPLICATION FILED AUG. 20, 1902. RENEWED AUG. 12, 1903.
NO MODEL. 2 SHEETS—SHEET 2.
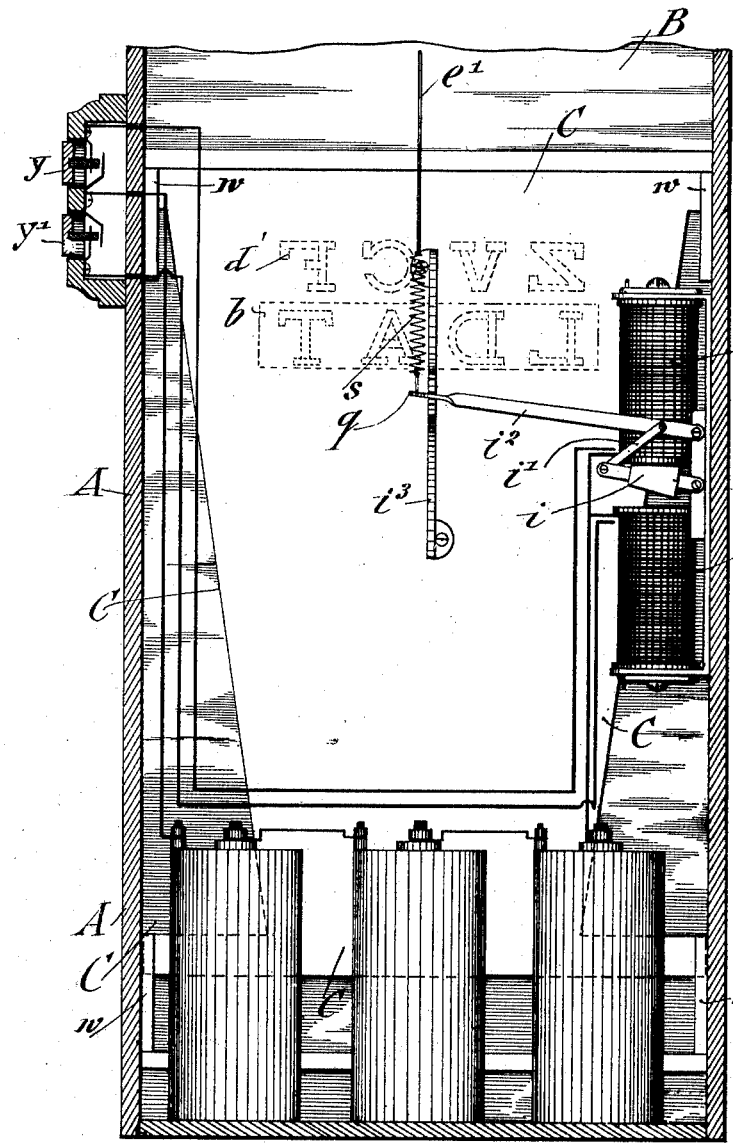
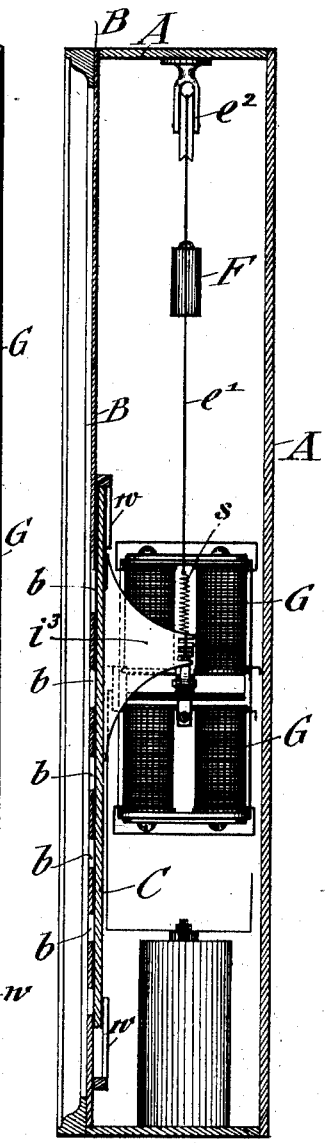

No. 759,229. Patented May 10, 1904.

UNITED STATES PATENT OFFICE.

ADOLPH BECHTOLD AND AUGUST C. BECHTOLD, OF NEW YORK, N. Y., ASSIGNORS TO THE MEYROWITZ MANUFACTURING COMPANY, A CORPORATION OF NEW JERSEY.

APPARATUS FOR TESTING THE EYESIGHT.

SPECIFICATION forming part of Letters Patent No. 759,229, dated May 10, 1904.

Application filed August 20, 1902. Renewed August 12, 1903. Serial No. 169,234. (No model.)

*To all whom it may concern:*

Be it known that we, ADOLPH BECHTOLD and AUGUST C. BECHTOLD, citizens of the United States, residing in New York, borough of Manhattan, and State of New York, have invented certain new and useful Improvements in Apparatus for Testing the Eyesight, of which the following is a specification.

This invention relates to apparatus for testing the eyesight, so that the required number and kind of glasses can be easily selected; and for this purpose the invention consists of an apparatus for testing the eyesight which comprises a casing, a stationary front plate provided with openings, a second plate shiftably guided back of the front plate and provided with rows of letters diminishing gradually in size from the uppermost to the lowermost row, said rows being arranged in pairs of different letters corresponding in size and location with the openings in the front plate, a motor mechanism arranged at the interior of the casing so as to shift the rear plate in upward or downward direction, and means for actuating said motor mechanism.

The invention consists, further, of certain details of construction and combinations of parts, which will be fully described hereinafter and finally pointed out in the claims.

In the accompanying drawings, Figure 1 is a perspective view of our improved apparatus for testing the eyesight. Fig. 2 is a front elevation showing the interior of the apparatus with the front plate removed. Fig. 3 is a rear elevation of the lower part of the apparatus, showing a modified construction of the motor mechanism; and Fig. 4 is a vertical transverse section taken on line 4 4, Fig. 1, of the apparatus, but showing the modified construction as in Fig. 3.

Similar letters of reference indicate corresponding parts.

Referring to the drawings, A represents a casing, which is preferably made oblong in shape and of wood or other suitable material. The casing A is composed of a rear board $a$, that is preferably attached to the wall on which our improved apparatus is to be supported in any suitable manner, the front portion of the casing being hinged on one side and locked to the rear board of the casing by a pivot-hook on the opposite end of the side wall of the casing, said hook engaging an eye on the rear wall of the casing. In place of the hook and eye a key-operated latch or any other closing locking mechanism may be used.

The casing A is closed at the front part by a front plate B, which is preferably made of pasteboard, sheet metal, or other suitable material, said front plate being provided with a number of oblong openings $b$ of equal or gradually-diminishing size, the uppermost opening being arranged about midway of the height of the front plate, while the other openings are arranged below the same in the lower part of the front plate, as shown clearly in Fig. 1. Above the oblong openings $b$ are printed on the front plate rows of letters or other characters $d$, gradually decreasing in size from the uppermost row downward. At the rear of the front plate B is guided in suitable ways $w$ a shiftable plate C, which is, like the front plate, made of stout cardboard or other suitable material and which is connected near its upper end by a suitable fastening device $e$, with an endless cord $e'$, that is guided on pulleys $e^2$, that are supported by hangers from the top and bottom of the casing A, said cord being attached by a link $f$ or otherwise to the hook or eye $e$ at the upper rear end of the shiftable plate C. The shiftable plate C is balanced by means of a counterweight F, which is attached to the lower part of the endless cord $l'$, so that it offers resistance to the motor mechanism by which the shifting motion is imparted to the plate C. On the face of the plate C are printed rows of letters $d'$ of different sizes, two rows having letters of equal size but of different character, the two adjacent rows of letters being of such size that they appear alternately in their corresponding openings $b$ of the front plate. The rows of letters that are printed on the shiftable plate C are so arranged that when the shiftable plate is in normal position one row of each pair appears in the openings in the front plate, while when the plate is shifted into its lowermost position the second row of letters of each pair appears in the openings in the front plate.

The motor mechanism by which the shiftable plate is operated may be either a hand-operated mechanism, such as a crank-operated rack-and-gear-wheel mechanism, or a spring-motor mechanism or any other equivalent mechanism, that shown in the drawings being electrically operated and comprising a number of battery-cells which are supported in suitable brackets along the side walls of the casing, connected in series with each other and placed in circuit with a suitable push-button P in the side wall of the casing and with an electromagnet G, the coils of which are connected with binding-posts $g$, also arranged on the side walls of the casing, as shown in Figs. 1 and 2. The armature of the electromagnet G is provided with a tapering point $l$, which engages a recessed lever $l'$, that is fulcrumed to a post $l^2$ in front of the electromagnet G, while the outer end of said armature-lever is interposed between the adjustable clamping devices $e^3$, that are attached to the shifting-cord $e'$, as shown in Fig. 2. The fulcrumed portion of the lever $l'$ is provided with two V-shaped recesses $l^3$, one on each side of the fulcrum, so that when the armature is attracted its tapering point $l$ engages one of said recesses, according as the lever is in its lower or raised position. When the shiftable plate C is in its normal or lower position and when the push-button is depressed, the armature will be attracted by the electromagnet G, so that the tapering point on the armature will engage the rear recess of the lever $l'$ and move the same into its upwardly-inclined position, as shown in dotted lines in Fig. 2. This produces the simultaneous downwardly shifting of the counterbalanced plate C by the shifting-cord $e'$. When the shiftable plate C is returned into its normal position and the push-button is again depressed, the armature is again attracted by the electromagnet, so that the point of the armature engages the front recess of the lever $l'$ and moves the same into its former downwardly-inclined position, as shown in Fig. 2, the shiftable plate C being moved thereby in upward direction. In the first or normal position one row of the letters is visible through the openings in the front plate, while in the second or shifted position of the plate C the second row of letters is visible through the same.

In place of the motor mechanism shown in Fig. 2 a modified construction is shown in Figs. 3 and 4, in which the electromagnet of Fig. 2 is replaced by two electromagnets, one being inverted, so that the ends of both magnet-cores face each other, but are separated so as to allow the up-and-down movement of an armature $i$. The armature $i$ is provided with two arms protruding at opposite sides, one arm being pivoted to the side wall of the casing A, while the other arm is connected by a pivot-link $i'$ with a lever $i^2$, one end of which is also pivoted to the side wall of the casing, while its opposite end is connected with a slotted bracket $i^3$, extending at right angles from the plate C. Attached to the end $q$ of the lever $i^2$ is one end of a helical spring $s$, the other end of which is fastened to a cord $e'$, which passes over a pulley $e^2$ at the top of the casing A. To the cord is fastened a weight F of sufficient size to counterbalance the weight of the shiftable plate C. Thus a movement of the armature in either direction will immediately operate the shiftable plate C in a corresponding direction. In the opposite side wall of the casing A is a double push-button $y\ y'$, which is connected electrically, so as to actuate either of the electromagnets at the will of the operator. By pressing the upper button $y$ the upper electromagnet is energized, thereby attracting the armature $i$ and actuating the lever $i^2$ so as to move the shiftable plate C in an upward direction. On pressing the lower button $y'$ the lower magnet is energized, the armature attracted, and the lever moved downward, thus moving the shiftable plate in downward direction.

Our improved apparatus is operated as follows: The person whose eyesight is to be tested is seated at a suitable distance from the apparatus. He is then asked to read the larger letters or characters at the upper portion of the front plate in downward direction until he arrives at one of the rows of letters in the openings which he cannot read off easily. The shiftable plate C is then shifted by actuating the motor mechanism and the person again called upon to read the rows of letters then appearing in the openings. These rows of letters are of the same size as the row of letters just disappearing, but of different characters, so that the person is compelled to read them without interference by the impression on his memory of the letters just shifted. This shifting is necessary so as to retest the eyesight by reading the new row of letters exhibited and obtain thereby a more accurate and reliable determination of the strength of the same than when the same letters or characters were presented again to his eyes. The number of the glasses required is determined by the size of the letters still within easy reach of the eyesight of the person, so that the optician can determine by the apparatus quickly and easily the proper number and kind of spectacles required for the eyes of the person tested.

Having thus described our invention, we claim as new, and desire to secure by Letters Patent—

1. An apparatus for testing eyesight, consisting of a casing having a front plate provided with a plurality of openings, a chart behind said front plate having on its face a plurality of groups of characters corresponding to the openings and arranged in rows, the size of the characters being graduated from one group to the next, but all the characters of a given group being of the same size, in combination with means for shifting the chart so as to expose any one row of each group at the respective openings in the front plate, substantially as described.

2. An apparatus for testing the eyesight consisting of a casing, a front plate in said casing provided with oblong openings, a shiftable plate back of the front plate and provided with rows of letters, said rows arranged in pairs with all the letters in a given pair of the same size, but the sizes in the successive pairs being graduated, said rows of the various pairs being located in relative position so that the members of each pair may be exhibited alternately in the openings of the front plate, and a motor mechanism connected with said shiftable plate whereby either row of each pair may, at will, be exhibited through the openings of the front plate.

3. An apparatus for testing the eyesight, consisting of a casing, a front plate in said casing provided with oblong openings gradually diminishing in size, a shiftable plate back of said front plate provided with rows of letters, said rows of letters arranged in pairs in each of which the letters are of equal size, but the letters of the successive pairs gradually diminishing in size and corresponding in size and location to the openings in the front plate and a motor mechanism consisting of an electromagnet, an armature, a weighted lever operated by said armature, and means for connecting said lever with the shiftable rear plate to permit it to be moved in either of two directions, substantially as set forth.

4. An apparatus for testing the eyesight, consisting of an exterior casing, a front plate in said casing provided with oblong openings gradually diminishing in size, a shiftable plate back of said front plate provided with pairs of rows of letters, the letters of a given pair being of uniform size but the letters of the successive pairs gradually diminishing in size and the pairs corresponding in size and location with the openings in the front plate, and a motor mechanism consisting of an electromagnet and a weighted cord, an armature, a lever operated by said armature connecting the front plate with said lever to permit it to be shifted in either direction by the armature-lever, substantially as set forth.

In testimony that we claim the foregoing as our invention we have signed our names in presence of two subscribing witnesses.

ADOLPH BECHTOLD.
AUGUST C. BECHTOLD.

Witnesses:
PAUL GOEPEL,
HENRY J. SUHRBIER.